(12) United States Patent
Chuang

(10) Patent No.: US 7,846,066 B1
(45) Date of Patent: Dec. 7, 2010

(54) LIGHT-EMITTING CONTROL CIRCUIT AND WRIST TRAINING BALL USING THE SAME

(75) Inventor: Pei-Sung Chuang, Taipei County (TW)

(73) Assignee: Nano-Second Technology Co., Ltd., Taipei County (TW)

( * ) Notice: Subject to any disclaimer, the term of this patent is extended or adjusted under 35 U.S.C. 154(b) by 0 days.

(21) Appl. No.: 12/770,043

(22) Filed: Apr. 29, 2010

(30) Foreign Application Priority Data

Mar. 11, 2010 (GB) ................................. 1004079.8

(51) Int. Cl.
*A63B 26/16* (2006.01)
(52) U.S. Cl. ................................ 482/1; 482/44; 482/45
(58) Field of Classification Search ................ 482/1–9, 482/44, 45, 127; 446/223–235
See application file for complete search history.

(56) References Cited

U.S. PATENT DOCUMENTS

| | | | |
|---|---|---|---|
| 4,150,580 A | | 4/1979 | Silkebakken et al. |
| 6,770,012 B2 * | | 8/2004 | Kuo ............................ 482/44 |
| 7,101,315 B2 * | | 9/2006 | Chuang et al. ................. 482/44 |
| 7,102,258 B2 * | | 9/2006 | Shen ............................ 310/50 |

* cited by examiner

*Primary Examiner*—Glenn Richman
(74) *Attorney, Agent, or Firm*—Tim Tingkang Xia; Morris, Manning & Martin, LLP

(57) ABSTRACT

A light-emitting control circuit and a wrist training ball using the same are described. The wrist training ball includes a light-emitting device. The light-emitting device includes an electricity generating circuit and a light-emitting control circuit. The electricity generating circuit generates electric power by rotational kinetic energy of the wrist training ball and outputs the electric power to the light-emitting control circuit. The light-emitting control circuit includes first and second light-emitting elements. According to a voltage value of a voltage output by the electricity generating circuit, the first light-emitting element is turned-on to emit red-light, or the second light-emitting element is turned-on to emit blue-light, which is mixed with the red-light into purple-light due to visual persistence phenomenon, or the first light-emitting element is turned-off to increase the voltage instantly to make the blue-light brighter, thereby producing different light emitting effects according to different rotational ranges of the wrist training ball.

10 Claims, 10 Drawing Sheets

LIGHT-EMITTING CONTROL CIRCUIT AND WRIST TRAINING BALL USING THE SAME

CROSS-REFERENCE TO RELATED APPLICATIONS

This non-provisional application claims priority under 35 U.S.C. §119(a) on Patent Application No(s). 1004079.8 filed in United Kingdom on Mar. 11, 2010, the entire contents of which are hereby incorporated by reference.

BACKGROUND OF THE INVENTION

1. Field of the Invention

The present invention relates to a light-emitting control circuit, and more particularly to a light-emitting control circuit applied in a wrist training ball.

2. Related Art

A wrist training ball (as disclosed in U.S. Pat. No. 4,150,580) utilizes a gyroscopic principle and a strong force generated during rotation under the eccentric force and inertial effects, so that a trainer holds and rotates a ball body with a hand to exercise an arm and a wrist. The wrist training ball is widely applied in wrist strength exercises, especially exercises about holding strength of fingers, endurance of wrists, and muscle strength of forearms, biceps, triceps, ligaments, and shoulders.

In order to make the use of the wrist training ball become more interesting, light-emitting diodes (LEDs) for emitting light rays can be disposed on the wrist training ball. Coils and a magnet are disposed on the wrist training ball, and a magnetic field of the magnet is changed due to the rotation of the wrist training ball, such that the coils generate electric power, so as to supply the power to the LEDs for emitting light. Additionally, in order to produce various light emission effects, a programmable controller or a microprocessor is connected to a plurality of LEDs having different colors in a method of the prior art. Specific programs are written in the controller, and the LEDs are controlled to be turned on and off intermittently driven by logic programs, so as to produce various light emission effects (as disclosed in U.S. Pat. No. 7,101,315).

However, a plurality of LEDs and controllers are all loading for the circuit. The larger the loading is, the greater the resistance will be, thereby causing a lower brightness of the LED. In addition, the controller itself requires a great deal of electric power for operation. That is to say, most of the electric power generated by the induction coils is supplied to the controller, thereby resulting in the even lower brightness of the light rays emitted by the LED, so that the light ray effects become rather poor.

In addition, the programmable controller or the microprocessor has a higher cost than a common passive device. For example, the use of the programmable controller or the microprocessor greatly increases the manufacturing cost of the wrist training ball.

Therefore, in order to provide the wrist training ball with various light emission and flickering effects, the programmable controller or the microprocessor is adopted, which sacrifices the light emission intensity of the LEDs or increases the cost of the wrist training ball.

SUMMARY OF THE INVENTION

In a light emitting mode of a wrist training ball in the prior art, if a programmable controller or a microprocessor is used to control a plurality of LEDs to be turned on or off intermittently, the cost is increased or even the light emission intensity is decreased. In view of the above problems, the present invention is a light-emitting control circuit applied in a wrist training ball.

The present invention provides a light-emitting control circuit, which comprises a first transistor, a second transistor, a first resistor, a second resistor, a third resistor, a first LED, and a second LED.

The first transistor has a first node, a second node, and a control node. The second transistor has a first node, a second node, and a control node. The first resistor has a first node and a second node. The second resistor has a first node and a second node. The third resistor has a first node and a second node. The first LED has a first anode and a first cathode. The second LED has a second anode and a second cathode.

The first node of the second transistor, the first node of the first resistor, and the first node of the second resistor receive a voltage source. The first node of the first transistor is electrically connected to the second node of the first resistor. The second node of the first transistor is electrically connected to the first anode of the first LED. The control node of the first transistor is electrically connected to the first node of the third resistor and the second node of the second transistor. The control node of the second transistor is electrically connected to the second node of the second resistor and the second anode of the second LED. The first cathode of the first LED, the second cathode of the second LED, and the second node of the third resistor are grounded.

The present invention provides a light-emitting device, which comprises an electricity generating circuit and a light-emitting control circuit. The electricity generating circuit comprises an induction coil, a rectifier and filter circuit. The induction coil is used for receiving an induced voltage. The rectifier and filter circuit is used for converting the induced voltage into an output voltage. The light-emitting control circuit is the same as the light-emitting control circuit discussed above.

The present invention provides a wrist training ball, which comprises a shell and a rotating ball. The rotating ball is located inside the shell. The above light-emitting device is disposed on the rotating ball. The light-emitting device comprises an electricity generating circuit and a light-emitting control circuit. A voltage received by the light-emitting control circuit is generated by the electricity generating circuit of the wrist training ball. A voltage value of the electricity generating circuit varies according to a rotating speed for rotating the wrist training ball, so that the first light-emitting element and the second light-emitting element form three light emission aspects corresponding to a low-level rotating speed, a mid-level rotating speed, and a high-level rotating speed respectively, so as to represent rotating speed ranges that a user rotates the wrist training ball. In addition, through the present invention, the cost of the light-emitting control circuit can be effectively reduced and a load of the light-emitting control circuit is decreased, thereby increasing brightness of light rays of the LEDs.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Detailed features and advantages of the present invention are illustrated below in detail in the detailed description, the content of which is sufficient for any person skilled in the art to understand technical contents of the present invention and implement the present invention accordingly. In addition, according to the content disclosed in the specification, claims, and accompanying drawings, any person skilled in the art can easily understand related objectives and advantages of the present invention.

Figure 1A:
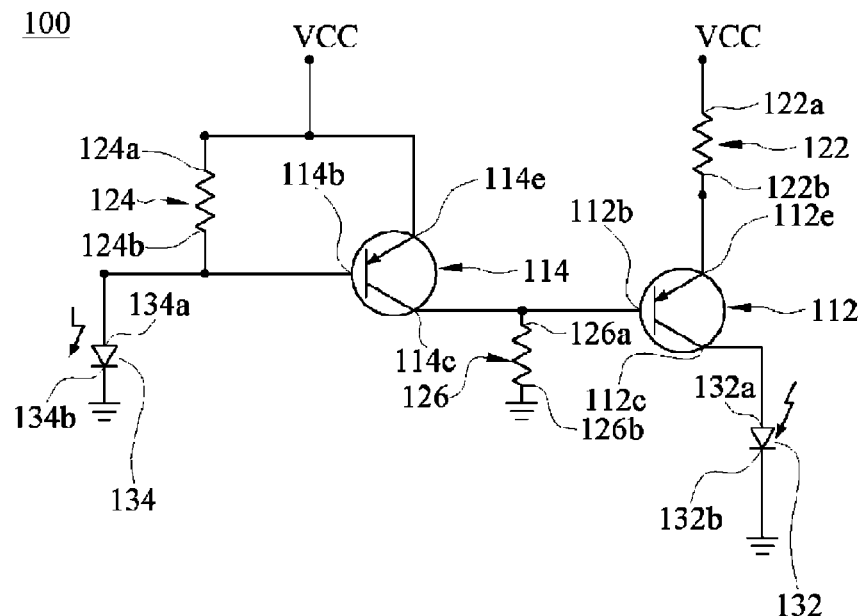
FIG. 1A is an equivalent circuit diagram of a first embodiment of a light-emitting control circuit.

FIG. 1A is an equivalent circuit diagram of a first embodiment of a light-emitting control circuit. Referring to FIG. 1A, a light-emitting control circuit 100 comprises a first transistor 112, a second transistor 114, a first resistor 122, a second resistor 124, a third resistor 126, a first LED 132, and a second LED 134. The light-emitting control circuit 100 receives a voltage source (voltage Vcc) and determines whether to turn on the first LED 132 and the second LED 134 according to a voltage value of the voltage Vcc.

The first transistor 112 has a first node, a second node, and a control node. The second transistor has a first node, a second node, and a control node. In this embodiment, the first transistor 112 may be a PNP bipolar junction transistor (BJT). The first node of the first transistor is a first emitter 112e. The second node of the first transistor is a first collector 112c. The control node of the first transistor is a first base 112b. The first node of the second transistor is a second emitter 114e. The second node of the second transistor is a second collector 114c. The control node of the second transistor is a second base 114b.

The first resistor 122 has a first node 122a and a second node 122b. The second resistor 124 has a first node 124a and a second node 124b. The third resistor 126 has a first node 126a and a second node 126b.

The first LED 132 has a first anode 132a and a first cathode 132b. The second LED 134 has a second anode 134a and a second cathode 134b. When a voltage difference between the first anode 132a and the first cathode 132b is greater than a forward bias of the first LED 132, the first LED 132 is turned on. The second LED 134 also has the same phenomenon. When being turned on, the first LED 132 and the second LED 134 emit light rays with different colors, and a forward bias of the second LED 134 is greater than the forward bias of the first LED 132. For example, the first LED 132 emits red light and the second LED 134 emits blue light. Besides the above colors, the first LED 132 and the second LED 134 may also emit light rays with other colors. For example, the first LED 132 emits orange light and the second LED 134 emits white light. In other words, as long as the forward bias of the second LED 134 is greater than the forward bias of the first LED 132, it falls within the scope of the present invention.

The first node 122a of the first resistor 122 and the first node 124a of the second resistor 124 are used for receiving the voltage Vcc.

The first emitter 112e is electrically connected to the second node 122b of the first resistor 122. The first base 112b is electrically connected to the third resistor 126. The first collector 112c is electrically connected to the first LED 132.

The second emitter 114e is used for receiving the voltage Vcc. The second base 114b is electrically connected to the second node 124b of the second resistor 124 and the second LED 134. The second collector 114c is electrically connected to the first base 112b and the first node 126a of the third resistor 126.

The first cathode 132b, the second cathode 134b, and the second node 126b of the third resistor 126 are grounded.

When the voltage Vcc is smaller than a first threshold value, neither the first LED 132 nor the second LED 134 is turned on. When the voltage Vcc exceeds the first threshold value, the voltage Vcc is sufficient for turning on the first LED 132, and the first LED 132 emits red light. The first threshold value approximately equals the forward bias of the first LED 132 plus a voltage across the first emitter 112e and the first collector 112c plus a voltage across the first resistor 122.

When the voltage Vcc continues to increase and exceeds a second threshold value, that is, the voltage Vcc is sufficient for turning on the second LED 134, the second LED 134 emits blue light, and the first LED 132 still keeps emitting red light. The voltage Vcc at this time approximately equals a voltage across the second resistor 124 plus the forward bias of the second LED 134.

When the voltage Vcc continues to increase and exceeds a third threshold value, that is, the voltage across the second resistor 124 is greater than a critical voltage of the second transistor 114, the second transistor 114 is turned on. At this time, the current flows to the third resistor 126 through the second transistor 114, so that the voltage across the two nodes of the third resistor 126 is dramatically increased, that is, the voltage between the first emitter 112e and the first base 112b of the first transistor 112 is greatly decreased. Therefore, the first transistor 112 is cut off. At this time, the second LED 134 keeps emitting light. However, the first LED 132 is turned off. In other words, only the second LED 134 emits blue light individually.

When the first LED 132 is turned off, the load of the light-emitting control circuit 100 is decreased, which makes the second LED 134 become brighter.

Figure 1B:
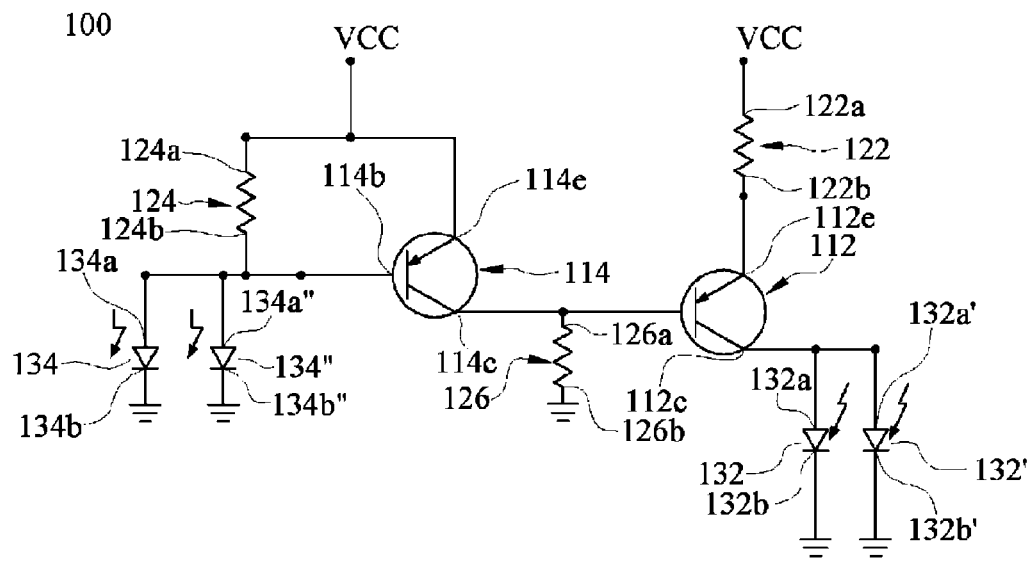
FIG. 1B is an equivalent circuit diagram of a second embodiment of a light-emitting control circuit.

FIG. 1B is an equivalent circuit diagram of a second embodiment of a light-emitting control circuit. Although the above structure only has one first LED 132 and one second LED 134, the present invention is not limited thereto. In order to enhance the light emission brightness or the aesthetic feeling in design, more first LEDs 132 and second LEDs 134 may be disposed. Specifically, two first LEDs 132, 132' may be connected in parallel. The first anodes 132a, 132a' of the first LEDs 132, 132' are connected to the first collector 112c together. The first cathodes 132b, 132b' of the first LEDs 132, 132' are both grounded. Two second LEDs 134, 134' may also be connected in parallel. The second anodes 134a, 134a' of the second LEDs 134, 134' are connected to the second node 124b of the second resistor 124 together. The second cathodes 134b, 134b' of the second LED 134, 134' are both grounded.

Figure 1C:
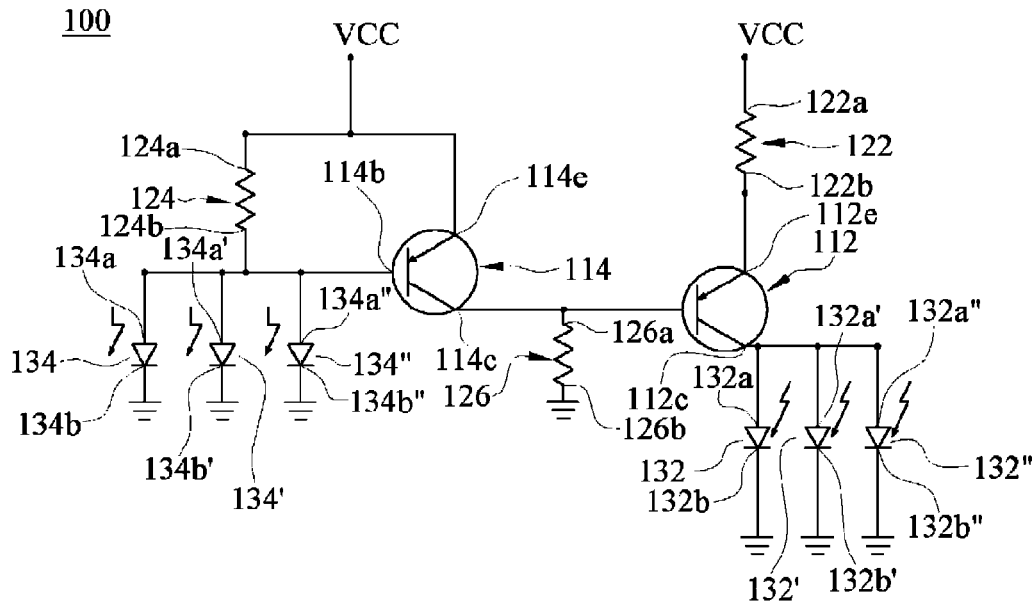
FIG. 1C is an equivalent circuit diagram of a third embodiment of a light-emitting control circuit.

FIG. 1C is an equivalent circuit diagram of a third embodiment of a light-emitting control circuit. Besides the above connection modes, persons skilled in the art can connect more first LEDs 132 and second LEDs 134 according to the spirit of the present invention. Specifically, three first LEDs 132, 132', 132" may be connected in parallel. The first anodes 132a, 132a', 132a" of the first LEDs 132, 132', 132" are connected to the first collector 112c together. The first cathodes 132b, 132b', 132b" of the first LEDs 132, 132', 132" are all grounded. Three second LEDs 134, 134', 134" may also be connected in parallel. The second anodes 134a, 134a', 134a" of the second LEDs 134, 134', 134" are connected to the second node 124b of the second resistor 124 together. The second cathodes 134b, 134b', 134b" of the second LEDs 134, 134', 134" are all grounded.

Figure 1D:
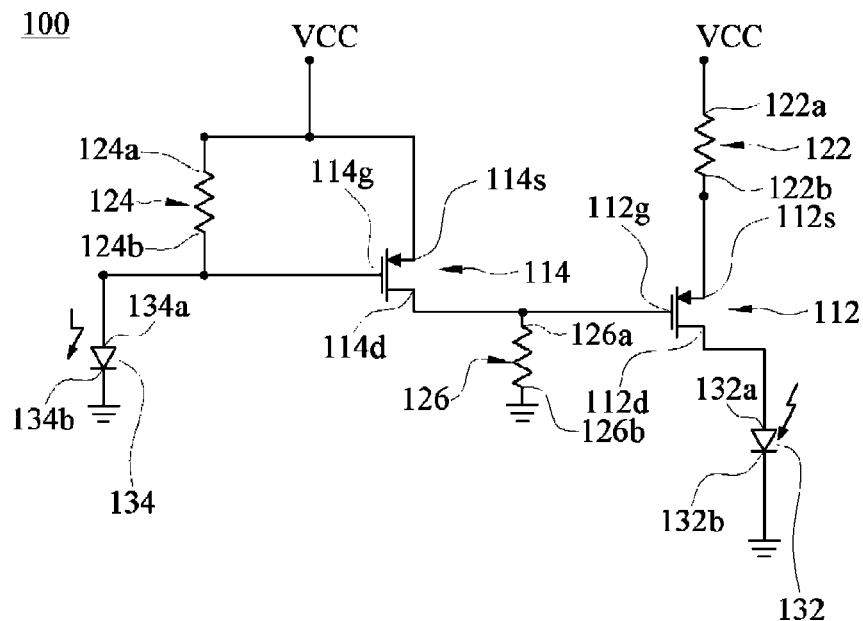
FIG. 1D is an equivalent circuit diagram of a fourth embodiment of a light-emitting control circuit.

FIG. 1D is an equivalent circuit diagram of a fourth embodiment of a light-emitting control circuit. Although the first transistor 112 and the second transistor 114 are PNP BJTs, persons skilled in the art may replace the PNP BJTs with P-type metal oxide semiconductors (MOSs) according to the spirit of this embodiment. In this embodiment, the P-type MOS replaces the PNP BJT. That is to say, a first source 112s is equivalent to the first emitter 112e, a first gate 112g is equivalent to the first base 112b, and a first drain 112d is equivalent to the first collector 112c. Similarly, a second source 114s is equivalent to the second emitter 114e, a second gate 114g is equivalent to the second base 114b, and a second drain 114d is equivalent to the second collector 114c. In addition, other elements of the light-emitting control circuit 100 are the same as that shown in FIG. 1A. Such a method can also be used in both FIGS. 1B and 1C.

Figure 1E:
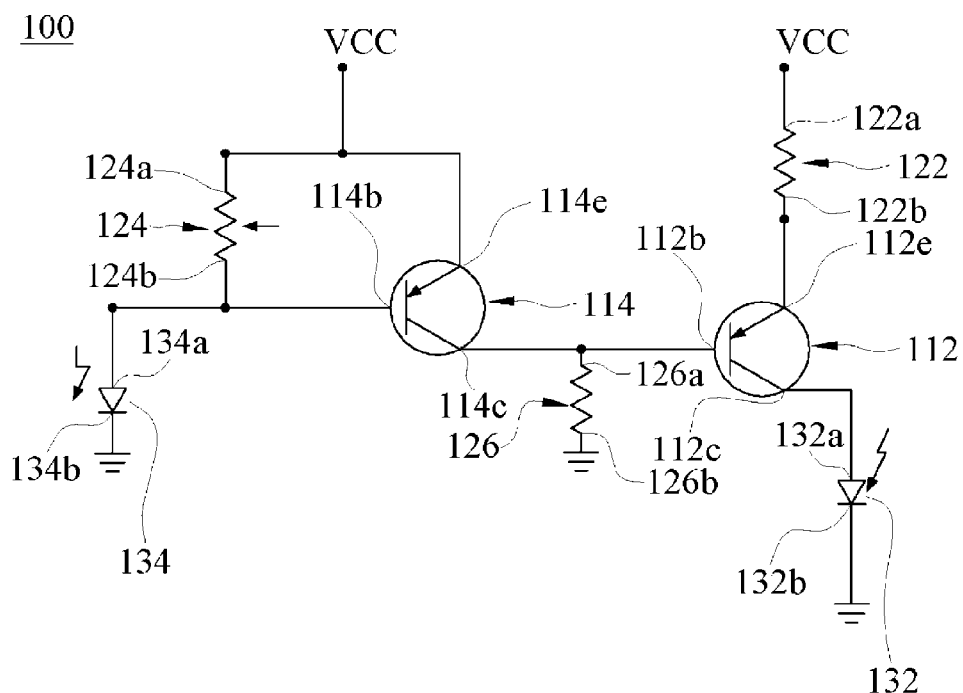
FIG. 1E is an equivalent circuit diagram of a fifth embodiment of a light-emitting control circuit.

FIG. 1E is an equivalent circuit diagram of a fifth embodiment of a light-emitting control circuit. In this embodiment, the second resistor 124 may be a variable resistor. By changing a resistance value of the variable resistor, the third threshold value can be adjusted. When the resistance value of the variable resistor becomes smaller, a higher voltage Vcc is required to turn on the second transistor 114, that is, the third threshold value becomes higher. On the contrary, the larger the resistance value of the variable resistor is, the lower the third threshold value will be. If the third threshold value becomes higher, it indicates that a higher rotating speed is required to enable the second LED 134 to emit blue light individually. That is to say, the user can change the threshold value for the emission of blue light by adjusting the resistance value of the variable resistor. The variable resistor is applicable to any embodiment in FIGS. 1A to 1D.

The light-emitting control circuit 100 according to the present invention determines whether to turn on the first LED 132 and the second LED 134 according to a voltage value of the voltage Vcc. The light-emitting control circuit 100 can replace the programmable controller or microprocessor in the prior art. In addition, the light-emitting control circuit 100 only requires two transistors (BJTs or MOSs) and three resistors. Therefore, the cost of the light-emitting control circuit 100 is much lower than that of the programmable controller or microprocessor in the prior art. In addition, the light-emitting control circuit 100 uses quite a few elements, so that the consumption of electric power is much lower than that of the programmable controller or microprocessor in the prior art. When the same power supply is input, the brightness of light rays emitted by the LEDs driven by the light-emitting control circuit 100 according to the present invention is much higher than that of light rays emitted by the LEDs driven by the programmable controller or microprocessor.

Figure 2A:
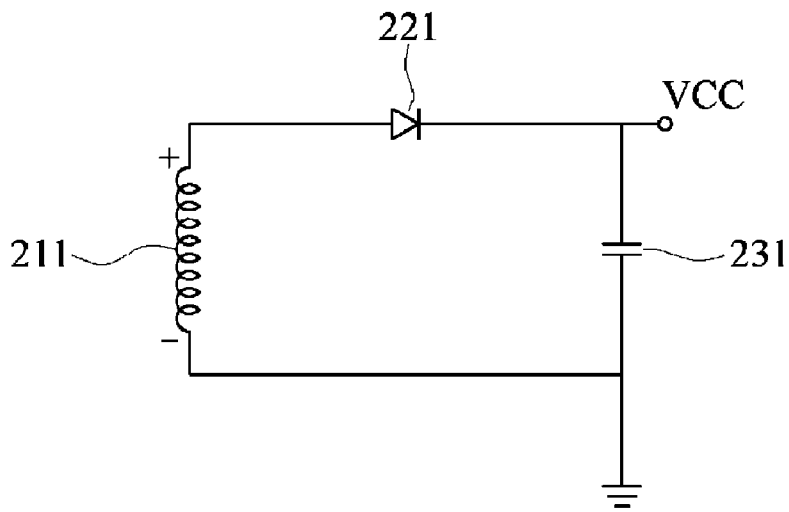
FIG. 2A is an equivalent circuit diagram of a first embodiment of an electricity generating circuit.

FIG. 2A is an equivalent circuit diagram of a first embodiment of an electricity generating circuit. The electricity generating circuit 200 comprises an induction coil 211 and a rectifier and filter circuit. The rectifier and filter circuit comprises a rectifier diode 221 and a filter capacitor 231.

The induction coil 211 may be an inductor. When the relative movement is generated between the induction coil 211 and a magnetic element (for example, a magnet), a magnetic field received by the induction coil 211 is changed, so that the induction coil 211 generates an induced voltage. When the magnetic field changed by the induction coil 211 is a sine function, the induced voltage is an alternating current (AC) voltage.

The rectifier diode 221 is used for converting the AC voltage into a direct current (DC) voltage. In this embodiment, when only one rectifier diode 221 is configured, the circuit may be called a half-wave rectifier.

Figure 2B:
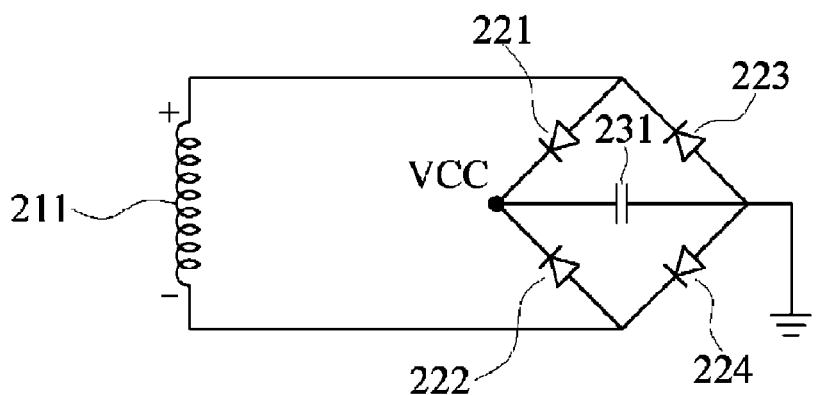
FIG. 2B is an equivalent circuit diagram of a second embodiment of an electricity generating circuit.

Persons skilled in the art can use a full-wave rectifier to replace the above half-wave rectifier. FIG. 2B is an equivalent circuit diagram of a second embodiment of an electricity generating circuit. In this embodiment, the electricity generating circuit 200 comprises four rectifier diodes 221, 222, 223, 224. When the induced voltage is a positive voltage, the current passes through the rectifier diodes 221, 224 and the filter capacitor 231. When the induced voltage is a negative voltage, the current passes through the rectifier diodes 222, 223 and the filter capacitor 231.

Figure 2C:
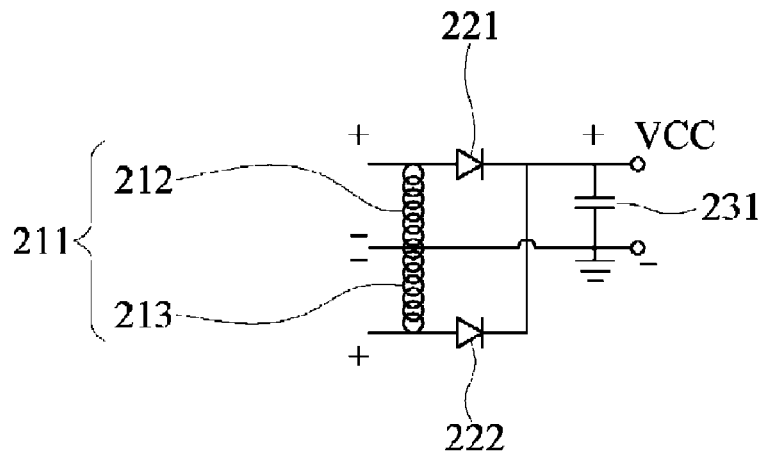
FIG. 2C is an equivalent circuit diagram of a third embodiment of an electricity generating circuit.

In addition, a center-tapped rectifier may also be used to replace the half-wave rectifier. FIG. 2C is an equivalent circuit diagram of a third embodiment of an electricity generating circuit. The electricity generating circuit 200 comprises two rectifier diodes 221, 222. When the induced voltage is a positive voltage, the current generated by an upper half end of the induction coil 211 passes through the rectifier diode 221 and the filter capacitor 231. When the induced voltage is a negative voltage, the current generated by a lower half end of the induction coil 211 passes through the rectifier diode 222 and the filter capacitor 231.

Figure 2D:
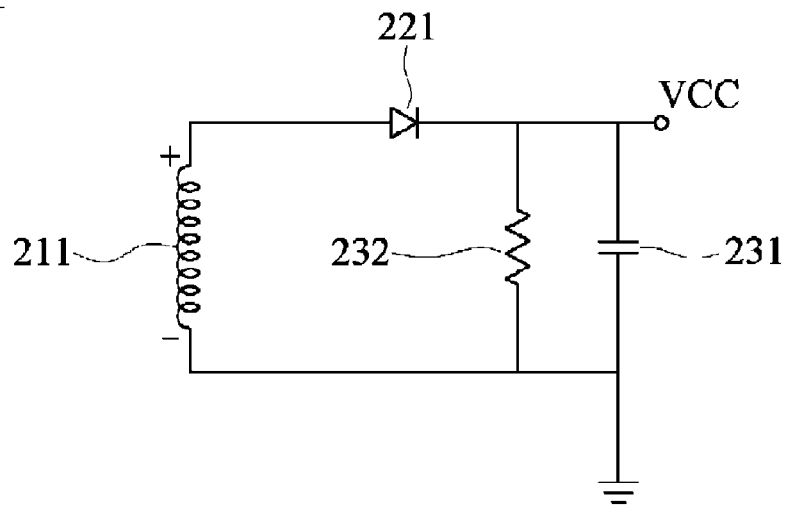
FIG. 2D is an equivalent circuit diagram of a fourth embodiment of an electricity generating circuit.

FIG. 2D is an equivalent circuit diagram of a fourth embodiment of an electricity generating circuit. Although the electricity generating circuit 200 in FIGS. 2A, 2B, and 2C only comprises a filter capacitor 231, persons skilled in the art can connect a filter resistor 232 with the filter capacitor 231 in parallel, so as to achieve the better filtering effect.

Through the above induction coil 211, the rectifier diode 221, and the filter capacitor 231, the electricity generating circuit 200 generates a DC voltage Vcc and supplies the DC voltage Vcc to the light-emitting control circuit 100, and the light-emitting control circuit 100 emits light rays with different colors according to a value of the voltage Vcc.

The light-emitting control circuit 100 and the electricity generating circuit 200 are applicable to various rotational devices, for example, the wrist training ball according to the present invention. However, the present invention is not limited thereto. The light-emitting device according to the present invention can be applied to all rotational devices such as bicycles, in-line skates, or yo-yos. Rotation energy produced by the rotation movement can be converted into electric power. The higher the rotating speed is, the higher the voltage value of the electric power will be. The light-emitting device according to the present invention can determine to emit light rays having different colors according to the voltage value, that is, according to the rotating speed.

Figure 3A:
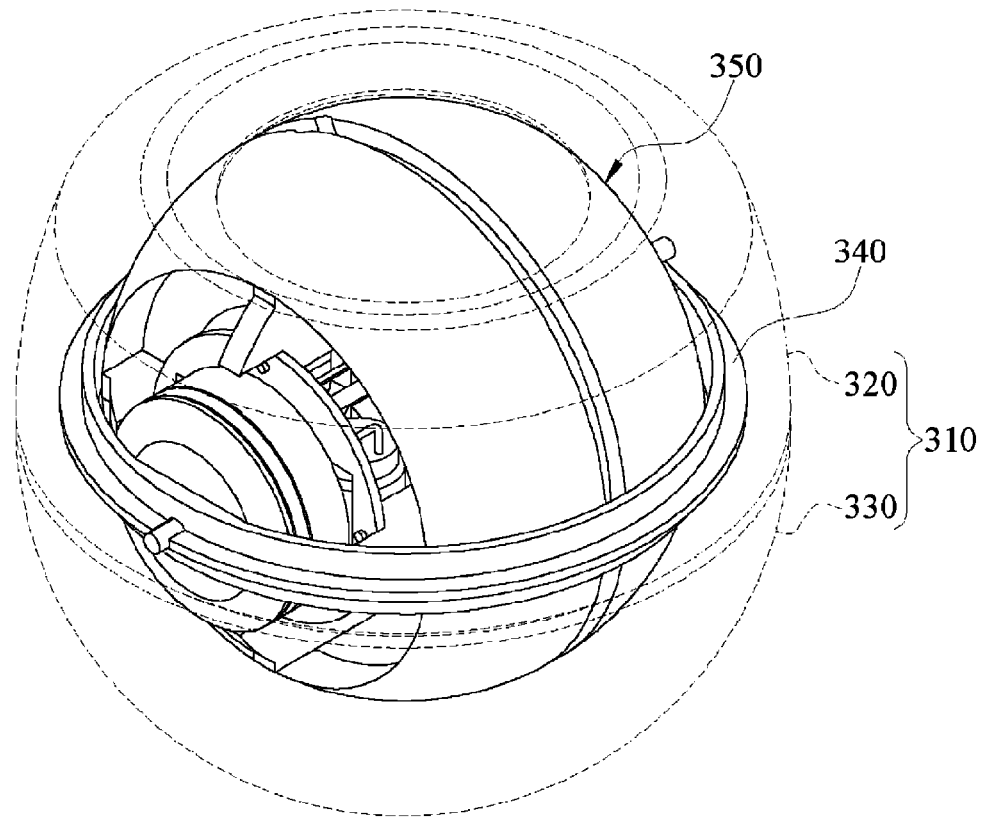
FIG. 3A is a structural three-dimensional outside view of a wrist training ball.
Figure 3B:
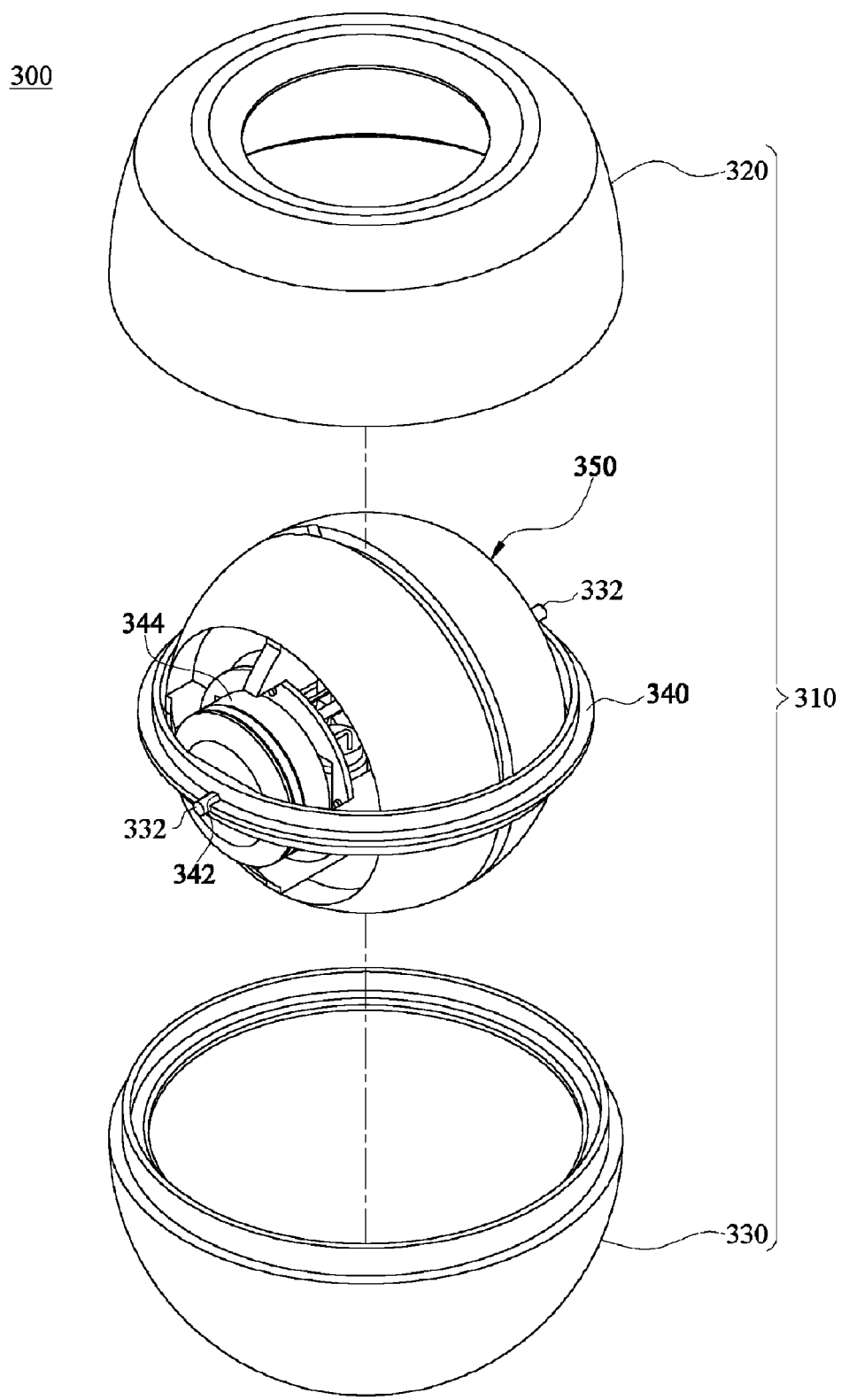
FIG. 3B is an exploded three-dimensional outside view of a wrist training ball.

FIGS. 3A and 3B show a wrist training ball using the above light-emitting device. FIG. 3A is a structural three-dimensional outside view of a wrist training ball. FIG. 3B is an exploded three-dimensional outside view of a wrist training ball. Referring to FIGS. 3A and 3B, a wrist training ball 300 comprises a shell 310 and a rotating ball 350.

The shell 310 comprises an upper shell body 320 and a lower shell body 330. An opening is opened at a top end of the upper shell body 320. The upper shell body 320 and the lower shell body 330 are configured into approximately hollow hemispheric shell bodies. The upper shell body 320 and the lower shell body 330 may be combined together to form a hollow space. The upper shell body 320 and the lower shell body 330 may be colored transparent shell bodies. As the above first LED 132 and second LED 134 are turned on or off, the transparent shell bodies are turned to show various different colors accordingly.

An outer ring 340 is placed between a lower edge of the upper shell body 320 and an upper edge of the lower shell body 330, and a rotating shaft hole 342 is opened at each end of the outer ring 340 respectively. A magnetic element 344 is fixed on the outer ring 340. The magnetic element 344 may be, but not limited to, a magnet.

The rotating ball 350 is located within the hollow space formed by the upper shell body 320 and the lower shell body 330. Two sides of the rotating ball 350 respectively have a rotating shaft 352. The two rotating shafts 352 can penetrate into the rotating shaft holes 342 respectively. The rotating ball 350 rotates about an axis along which the rotating shafts 352 extend.

Figure 3C:
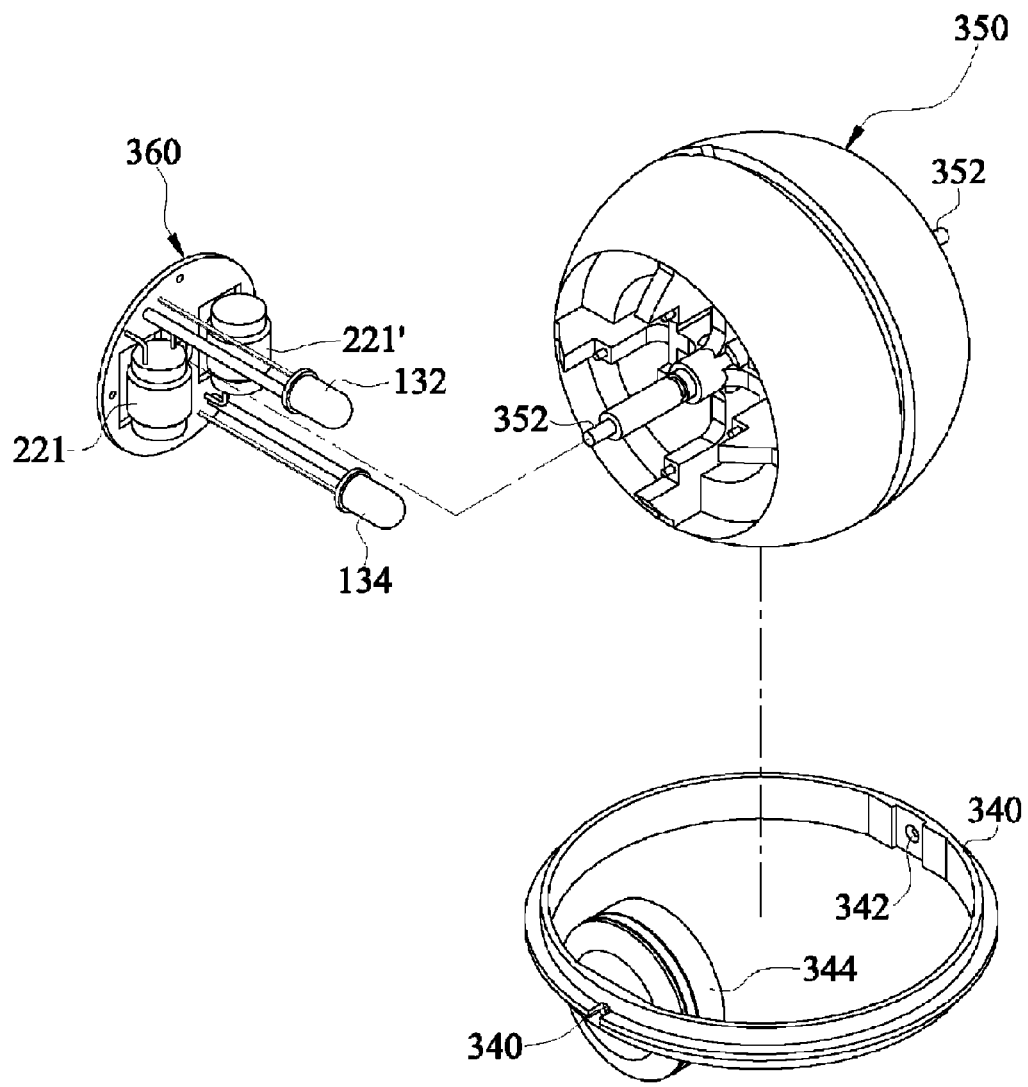
FIG. 3C is a detailed exploded three-dimensional outside view of a wrist training ball.

Referring to FIG. 3C, a circuit board 360 is disposed on the rotating ball 350. The above light-emitting control circuit 100 and the electricity generating circuit 200 are disposed on the circuit board 360. The first LED 132 and the second LED 134 of the light-emitting control circuit 100 stand vertically on the circuit board 360. The first LED 132 and the second LED 134 may penetrate through the through holes in the center of the rotating ball 350. Elements 221, 221' can rotate relative to the magnetic element 344 to generate an induced voltage, which is rectified and filtered into a voltage Vcc. The voltage Vcc is supplied to the light-emitting control circuit 100. The light-emitting control circuit 100 controls the first LED 132 or the second LED 134 according to a voltage value of the voltage Vcc. That is to say, the wrist training ball 300 emits different light rays according to different rotating speeds.

Figure 3D:
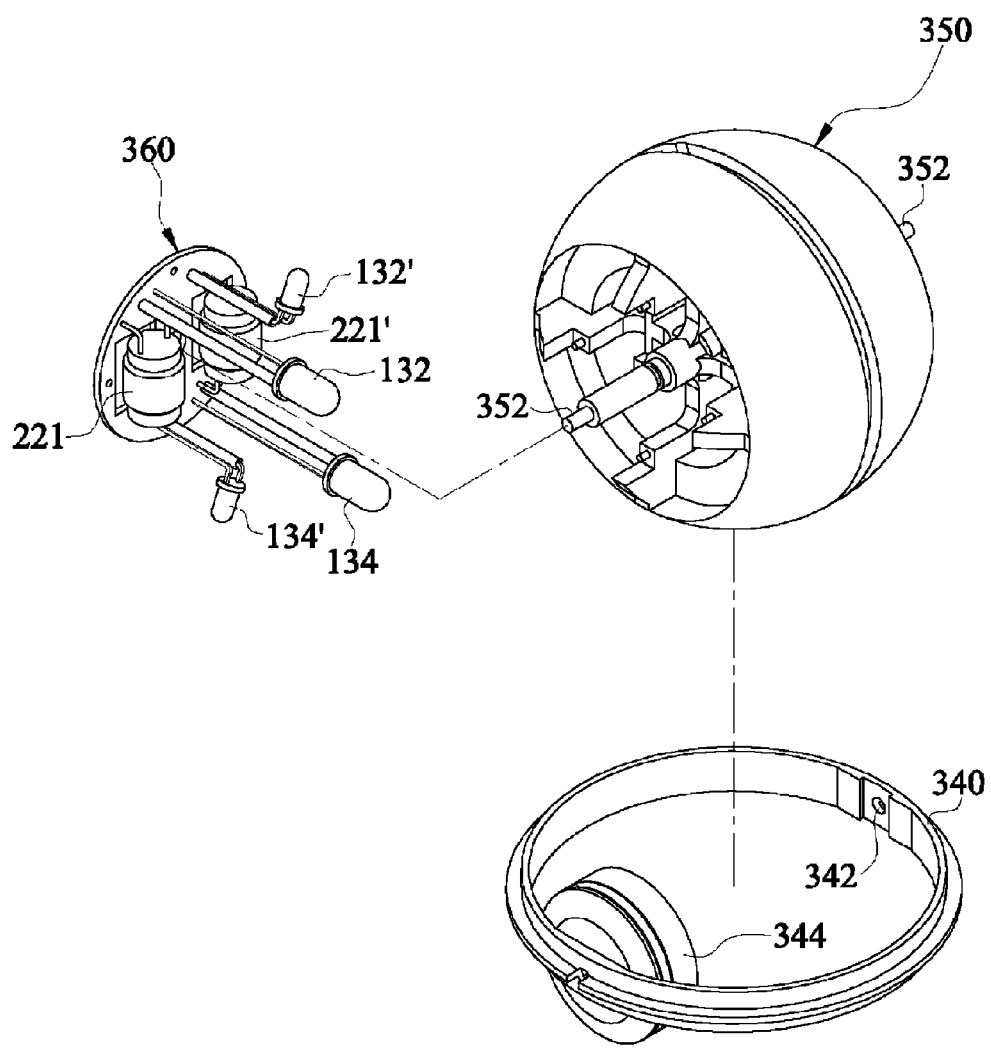
FIG. 3D is a detailed exploded three-dimensional outside view of a wrist training ball.

Referring to FIG. 3D, two first LEDs 132, 132' and two second LEDs 134, 134' are disposed on the circuit board 360. The two first LEDs 132, 132' and the two second LEDs 134, 134' can be further understood with reference to FIG. 1B, the description of which is omitted here.

Figure 4:
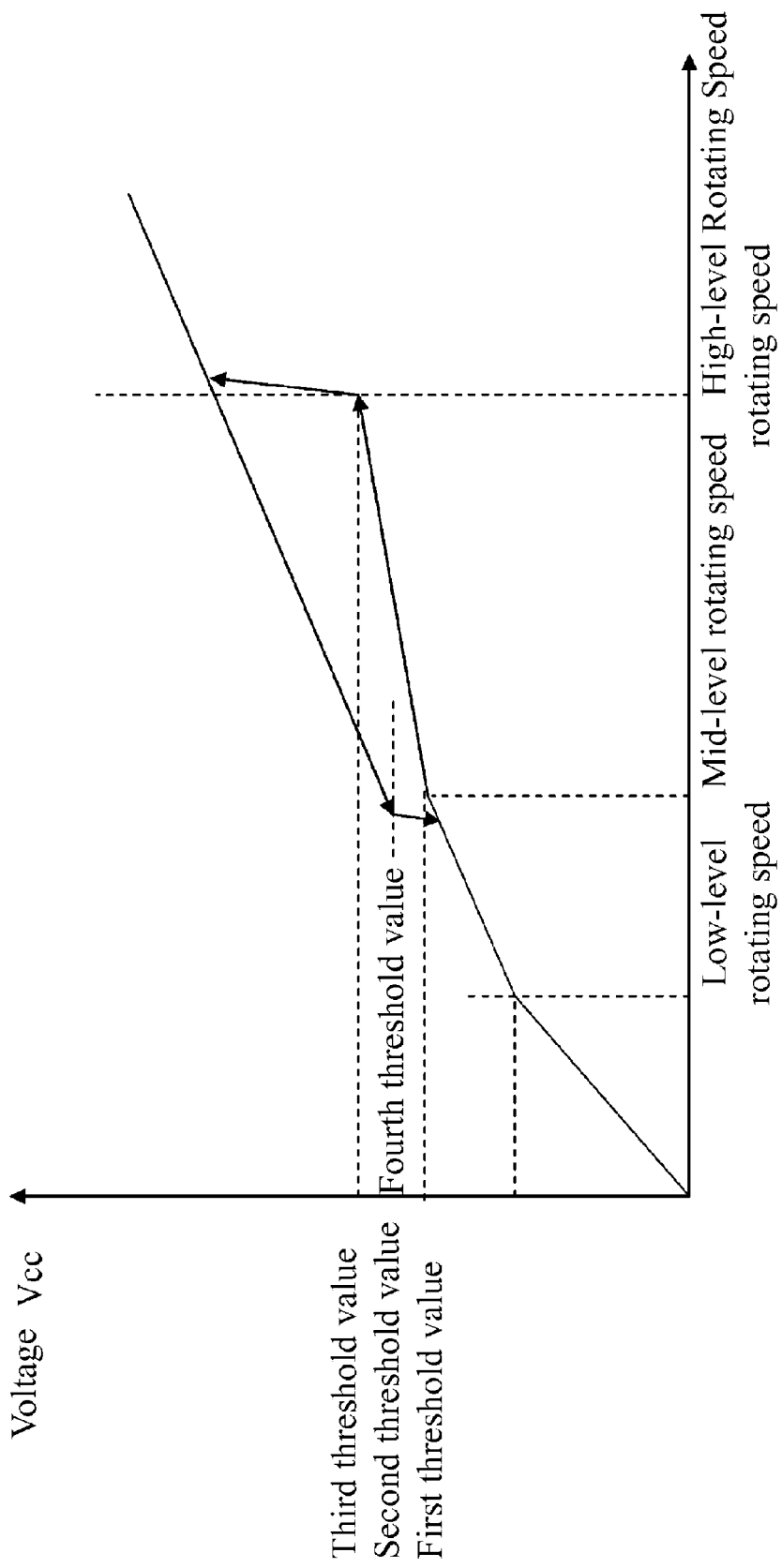
FIG. 4 is a relation diagram between a rotating speed of a rotating ball and a voltage.

FIG. 4 is a relation diagram between a rotating speed of a rotating ball and a voltage. In FIG. 4, a transverse axis represents the rotating speed of the rotating ball and a longitudinal axis represents the voltage Vcc.

When the wrist training ball 300 stays still, that is, the rotating speed of the rotating ball 350 is zero, the voltage Vcc is a zero voltage. When the rotating speed of the rotating ball 350 as a rotating object gradually increases, the voltage Vcc also gradually increases.

When the rotating speed of the rotating ball 350 keeps rising and reaches a low-level rotating speed, that is, the voltage Vcc exceeds a first threshold value, the voltage Vcc is sufficient for turning on the first LED 132.

When the rotating speed of the rotating ball 350 continues to rise and reaches a mid-level rotating speed, that is, the voltage Vcc exceeds a second threshold value, the voltage Vcc is sufficient for turning on the second LED 134, and the second LED 134 emits blue light and the first LED 132 still keeps emitting red light. Since the first LED 132 and the second LED 134 emit red light and blue light at the same time, under a visual persistence phenomenon generated through high-speed rotation, the light-emitting device seems to emit purple light between the red light and the blue light.

When the rotating speed of the rotating ball 350 rises ceaselessly and reaches a high-level rotating speed, that is, the voltage Vcc exceeds a third threshold value, a voltage across the second resistor 124 becomes greater than a critical voltage of the second transistor 114, and the second transistor 114 is turned on, so that the first transistor 112 is cut off. At this time, the first LED 132 is turned off. However, the second LED 134 keeps emitting light. In other words, only the second LED 134 emits blue light individually.

When the first LED 132 is turned off, the load of the light-emitting control circuit 100 is decreased, so that the voltage Vcc is increased instantly and the second LED 134 becomes brighter. As the voltage Vcc is increased instantly, the voltage across the second resistor 124 is also increased at the same proportion. That is to say, the voltage across the second resistor 124 at this time is far greater than the critical voltage of the second transistor 114. Therefore, even if the rotating speed of the rotating ball 350 starts to slow down, the second transistor 114 is still turned on, and the second LED 134 keeps emitting blue light.

When the rotating speed of the rotating ball 350 keeps dropping and the voltage Vcc becomes lower than a fourth threshold value, that is, the voltage Vcc is not sufficient for turning on the second LED 134, the second LED 134 no longer emits light. Meanwhile, the second transistor 114 is cut off, and the first transistor 112 is turned on, so that the first LED 132 is turned on and emits light. That is to say, the original blue light emitted by the second LED 134 is directly changed into the red light emitted by the first LED 132.

The wrist training ball according to the present invention can emit red light at a low-level rotating speed, emit purple light at a mid-level rotating speed, and emit blue light at a high-level rotating speed, so that the user is enabled to know a current rotating speed range according to the emitted light rays.

What is claimed is:

1. A light-emitting control circuit, for receiving a voltage source, the light-emitting control circuit comprising:

a first transistor, having a first node, a second node, and a control node;

a second transistor, having a first node, a second node, and a control node, wherein the first node of the second transistor receives the voltage source, and the second node of the second transistor is electrically connected to the control node of the first transistor;

a first resistor, having a first node and a second node, wherein the first node of the first resistor receives the voltage source, and the second node of the first resistor is electrically connected to the first node of the first transistor;

a second resistor, having a first node and a second node, wherein the first node of the second resistor receives the voltage source, and the second node of the second resistor is electrically connected to the control node of the second transistor;

a third resistor, having a first node and a second node, wherein the first node of the third resistor is electrically connected to the second node of the second transistor and the control node of the first transistor, and the second node of the third resistor is grounded;

a first light-emitting diode (LED), having a first anode and a first cathode, wherein the first anode is electrically connected to the second node of the first transistor, and the first cathode is grounded; and a second LED, having a second anode and a second cathode, wherein the second anode is electrically connected to the second node of the second transistor and the control node of the second transistor, the second cathode is grounded, and a forward bias of the second LED is greater than a forward bias of the first LED;

wherein when a voltage value of the voltage source is greater than a first threshold value, the first LED is turned on, when the voltage value is greater than a second threshold value, the first LED and the second LED are turned on at the same time, and when the voltage value is greater than a third threshold value, the first LED is not turned on and the voltage value is increased instantly.

2. The light-emitting control circuit according to claim 1, wherein after the voltage value is greater than the third threshold value, if the voltage value drops to be smaller than a fourth threshold value, the second LED is not turned on and the first LED is turned on.

3. The light-emitting control circuit according to claim 1, wherein the first transistor and the second transistor are PNP bipolar junction transistors (BJTs), the first node of the first transistor is a first emitter, the second node of the first transistor is a first collector, the control node of the first transistor is a first base, the first node of the second transistor is a second emitter, the second node of the second transistor is a second collector, and the control node of the second transistor is a second base.

4. The light-emitting control circuit according to claim 1, wherein the first transistor and the second transistor are P-type metal oxide semiconductors (MOSs), the first node of the first transistor is a first source, the second node of the first transistor is a first drain, the control node of the first transistor is a first gate, the first node of the second transistor is a second source, the second node of the second transistor is a second drain, and the control node of the second transistor is a second gate.

5. The light-emitting control circuit according to claim 1, wherein the second resistor is a variable resistor, for adjusting the third threshold value.

6. A wrist training ball using a light-emitting control circuit, comprising:

a shell, fixed with a magnetic element; and a rotating body, located inside the shell, and comprising a light-emitting device, wherein the light-emitting device comprises:

an electricity generating circuit, comprising:

an induction coil, for receiving an induced voltage; and a rectifier and filter circuit, for converting the induced voltage into an output voltage; and a light-emitting control circuit, for receiving the output voltage, wherein the light-emitting control circuit comprises:

a first transistor, having a first node, a second node, and a control node;

a second transistor, having a first node, a second node, and a control node, wherein the first node of the second transistor receives the output voltage, and the second node of the second transistor is electrically connected to the control node of the first transistor;

a first resistor, having a first node and a second node, wherein the first node of the first resistor receives the output voltage, and the second node of the first resistor is electrically connected to the first node of the first transistor;

a second resistor, having a first node and a second node, wherein the first node of the second resistor receives the output voltage, and the second node of the second resistor is electrically connected to the control node of the second transistor;

a third resistor, having a first node and a second node, wherein the first node of the third resistor is electrically connected to the second node of the second transistor and the control node of the first transistor, and the second node of the third resistor is grounded;

a first light-emitting diode (LED), having a first anode and a first cathode, wherein the first anode is electrically connected to the second node of the first transistor, and the first cathode is grounded; and a second LED, having a second anode and a second cathode, wherein the second anode is electrically connected to the second node of the second transistor and the control node of the second transistor, the second cathode is grounded, and a forward bias of the second LED is greater than a forward bias of the first LED;

wherein when an voltage value of the output voltage is greater than a first threshold value, the first LED is turned on, when the voltage value is greater than a second threshold value, the first LED and the second LED are turned on at the same time, and when the voltage value is greater than a third threshold value, the first LED is not turned on and the output voltage is increased instantly.

7. The wrist training ball using the light-emitting control circuit according to claim 6, wherein after the voltage value is greater than the third threshold value, if the voltage value drops to be smaller than a fourth threshold value, the second LED is not turned on and the first LED is turned on.

8. The wrist training ball using the light-emitting control circuit according to claim 6, wherein the first transistor and the second transistor are PNP bipolar junction transistors (BJTs), the first node of the first transistor is a first emitter, the second node of the first transistor is a first collector, the control node of the first transistor is a first base, the first node of the second transistor is a second emitter, the second node of the second transistor is a second collector, and the control node of the second transistor is a second base.

9. The wrist training ball using the light-emitting control circuit according to claim 6, wherein the first transistor and the second transistor are P-type metal oxide semiconductors (MOSs), the first node of the first transistor is a first source, the second node of the first transistor is a first drain, the control node of the first transistor is a first gate, the first node of the second transistor is a second source, the second node of the second transistor is a second drain, and the control node of the second transistor is a second gate.

10. The wrist training ball using the light-emitting control circuit according to claim 6, wherein the second resistor is a variable resistor, for adjusting the third threshold value.

* * * * *